United States Patent [19]

Matsumoto et al.

[11] Patent Number: 5,349,017
[45] Date of Patent: Sep. 20, 1994

[54] POLYVINYL CHLORIDE RESIN COMPOSITION

[75] Inventors: Koji Matsumoto; Masaru Morimoto; Masahiro Osuka; Naomi Uno, all of Otake, Japan

[73] Assignee: Mitsubishi Rayon Company Ltd., Tokyo, Japan

[21] Appl. No.: 984,238

[22] Filed: Dec. 1, 1992

Related U.S. Application Data

[63] Continuation of Ser. No. 728,364, Jul. 11, 1991, abandoned.

Foreign Application Priority Data

Jul. 24, 1990 [JP] Japan ................... 2-195266

[51] Int. Cl.$^5$ .................. C08L 9/04; C08F 265/04
[52] U.S. Cl. ........................ 525/84; 525/57; 525/59; 525/73; 525/78; 525/82; 525/83; 525/305; 525/310
[58] Field of Search ............ 525/84, 305, 57, 59, 525/73, 78, 83, 82, 310, 902

[56] References Cited

U.S. PATENT DOCUMENTS

| | | | |
|---|---|---|---|
| 3,886,235 | 5/1975 | Tanaka et al. | 525/305 |
| 3,971,835 | 7/1976 | Myers et al. | 525/85 |
| 4,362,845 | 12/1982 | Kamata et al. | 525/84 |
| 4,657,976 | 4/1987 | Ott et al. | 525/84 |

FOREIGN PATENT DOCUMENTS

| | | |
|---|---|---|
| 0163939 | 12/1985 | European Pat. Off. |
| 0278788 | 8/1988 | European Pat. Off. |
| 0347726 | 12/1989 | European Pat. Off. |
| 2090606 | 7/1982 | United Kingdom |

*Primary Examiner*—John Kight, III
*Assistant Examiner*—John M. Cooney, Jr.
*Attorney, Agent, or Firm*—Oblon, Spivak, McClelland, Maier & Neustadt

[57] ABSTRACT

A polyvinyl chloride resin composition comprising (i) 100 parts by weight of a polyvinyl chloride resin and (ii) 2 to 40 parts by weight of a multi-stage copolymer obtained by polymerizing resin component formable monomers in the range of from more than 30 parts by weight to 50 parts by weight in three stages onto 50-70 parts by weight of a butadiene elastomer having a glass transition temperature ranging from −40° C. to 5° C. obtained by a copolymerization of a monomer mixture of 70 to 90% by weight of butadiene, 10 to 30 percent by weight of an aromatic vinyl monomer and a polyfunctional monomer added in an amount corresponding to 3 to 10 parts by weight per 100 parts by weight of the total amount of the butadiene and aromatic vinyl monomer.

9 Claims, No Drawings

POLYVINYL CHLORIDE RESIN COMPOSITION

This application is a continuation of application Ser. No. 07/728,364, filed on Jul. 11, 1991, now abandoned.

BACKGROUND OF THE INVENTION

1. Field of the Invention

The present invention relates to a polyvinyl chloride resin composition having an excellent impact resistance, particularly a falling weight impact resistance, stress-whitening resistance, and optical characteristics.

2. Description of the Related Art

Polyvinyl chloride resin has excellent chemical and physical properties, and therefore, is widely used in many fields. Nevertheless, polyvinyl chloride resin per se has a drawback of an inferior impact resistance, and a large number of proposals have been made for an elimination of this drawback.

For example, Japanese Patent Publication (Kokoku) No. 42-20847 proposes a polyvinyl chloride resin composition comprising 30 parts by weight or less of a graft copolymer and 70 parts or more by weight of a polyvinyl chloride resin, wherein said graft copolymer is obtained by graft polymerizing 80 to 30 parts by weight of the monomers as the total of 40 to 80% by weight of a methacrylic acid ester and 60 to 20% by weight of styrene onto 20 to 70 parts by weight of a polymer composed mainly of 1,3-butadiene, said graft polymerization being conducted by first graft polymerizing the methacrylic acid ester and then graft copolymerizing styrene.

Japanese Patent Publication (Kokoku) 47-23648 proposes a polyvinyl chloride resin composition comprising a graft copolymer and a vinyl chloride resin, wherein said graft copolymer is obtained by graft polymerizing first methyl methacrylate in the presence of an elastomer and then graft polymerizing styrene.

Also, Japanese Patent Publication (Kokoku) No. 57-26536 proposes a polyvinyl chloride resin composition comprising 3 to 40 parts by weight of a graft copolymer and 97 to 60 parts by weight of a polyvinyl chloride resin, wherein said graft copolymer is obtained by graft polymerizing 65 to 25 parts by weight of monomer group comprising methyl methacrylate, an alkyl acrylate and styrene and optionally a polyfunctional crosslinking agent in the presence of 35 to 75 parts by weight of a 1,3-butadiene type elastomer, said graft polymerization being conducted by graft polymerizing in the first stage 50 to 90% by weight of the total amount of a major amount of methyl methacrylate and a minor amount of an alkyl acrylate and optionally a polyfunctional crosslinking agent having an allyl group, in the presence of 35 to 75 parts by weight of a 1,3-butadiene type elastomer, and then graft polymerizing styrene in the second stage, and further, graft polymerizing 10 to 50% by weight of the total amount of methyl methacrylate and an alkyl acrylate.

Further, Japanese Patent Publication (Kokoku) No. 2-19145 proposes a polyvinyl chloride resin composition comprising 2 to 40% by weight of a graft copolymer and 60 to 98% by weight of a polyvinyl chloride resin, wherein said graft copolymer is obtained by graft polymerizing 30 to 15 parts by weight of a monomer mixture comprising an alkyl methacrylate and an aromatic vinyl or a monomer mixture comprising an alkyl methacrylate, an aromatic vinyl and an unsaturated nitrile onto 70 to 85 parts by weight of a highly crosslinked butadiene rubber with a particle size of 600 to 3000 Å, a total crosslinking agent in an amount of 1 to 10% by weight and a degree of swelling of 7 or less, said graft polymerization being conducted by one stage or multi stage.

In the polyvinyl chloride resin composition proposed in Japanese Patent Publication (Kokoku) No. 42-20847 or 47-23648, however, an ungelled product is liable to remain under extrusion conditions of a low degree of mixing, whereby, for example, a large generation of fish eyes occurs when formed into a sheet, the optical characteristics are poor, the stress-whitening resistance is poor, and the dart falling weight impact strength is too poor. Also, since styrene as the final graft component is polymerized during the preparation of the graft copolymer used, a styrene having a slow polymerization rate often is left, and consequently, remains in the graft copolymer powder and causes an objectionable odor to arise, and thus has a drawback in that the use of such a polyvinyl chloride resin composition is limited.

In the polyvinyl chloride resin composition proposed in Japanese Patent Publication (Kokoku) No. 57-26536, however, although the optical characteristics such as a total light transmittance and haze value are good, a product having a satisfactory stress-whitening resistance and falling weight impact strength cannot be obtained.

Further, in the polyvinyl chloride resin composition proposed in Japanese Patent Publication (Kokoku) No. 2-19145, although the impact resistance is excellent, the optical characteristics such as a total light transmittance and haze value are poor, and further, the stress-whitening resistance is not satisfactory.

SUMMARY OF THE INVENTION

Accordingly, the objects of the present invention are to eliminate the above-mentioned disadvantages of the prior art and to provide a polyvinyl chloride resin composition having an excellent impact resistance, particularly a falling weight impact resistance, and an excellent stress-whitening resistance and optical characteristics.

Other objects and advantages of the present invention will be apparent from the following description.

In accordance with the present invention, there is provided a polyvinyl chloride resin composition having an excellent falling weight impact resistance, stress-whitening resistance and optical characteristics, comprising 100 parts by weight of a polyvinyl chloride resin and 2 to 40 parts by weight of a multi-stage copolymer obtained by polymerizing a resin component formable monomer in the range of from more than 30 parts by weight to 50 parts by weight, said resin component formable monomer being composed of a ratio of 25 to 55% by weight of methyl methacrylate, 2 to 15% by weight of an alkyl acrylate (alkyl group having 1 to 8 carbon atoms) and 30 to 60% by weight of an aromatic vinyl monomer in the presence of from 50 parts by weight to less than 70 parts by weight of a butadiene elastomer having a glass transition temperature of from −40° C. to 5° C. obtained by copolymerization of a monomer mixture of 70 to 90% by weight of butadiene, 10 to 30% by weight of an aromatic vinyl monomer and a polyfunctional monomer added in an amount corresponding to 3 to 10 parts by weight per 100 parts by weight of total amount of said butadiene and aromatic vinyl monomer, wherein a polymerization of the resin component formable monomer is conducted by polymerizing in the first stage methyl methacrylate in an amount corresponding to 45 to 85% by weight of the total amount of methyl methacrylate and the alkyl acrylate in an amount within the range specified above, subsequently polymerizing in the second stage the aromatic vinyl monomer in an amount within the range specified above in the presence of the polymer obtained in the previous stage, and further polymerizing in the third stage the remainder of methyl methacrylate in the presence of the polymers obtained in the polymerizations in the first and second stages.

DESCRIPTION OF THE PREFERRED EMBODIMENTS

According to the present invention, the above-mentioned object can be accomplished by formulating a multi-stage copolymer with a polyvinyl chloride resin, said multi-stage copolymer being obtained by using a highly crosslinked butadiene elastomer as the rubber component at a ratio within a specific range, and polymerizing resin component formable monomers at a special composition ratio in 3 stages in the presence of the above-mentioned rubber component.

As the polyvinyl chloride resin to be used in the present invention, polyvinyl chloride or a copolymer of 70% by weight or more of vinyl chloride and 30% by weight or less of another monomer copolymerizable therewith can be used. Examples of other copolymerizable monomers include vinyl bromide, vinylidene chloride, vinyl acetate, acrylic acid, methacrylic acid, and ethylene.

The average degree of polymerization of the polyvinyl chloride resin to be used in the present invention is not particularly limited, but preferably, such a resin having an average degree of polymerization of 600 to 1,000, more preferably 650 to 900, is used.

The multi-stage copolymer to be used in the present invention is obtained by polymerizing, in 3 stages, methyl methacrylate, an alkyl acrylate and an aromatic vinyl monomer, which are resin component formable monomers, at a specific ratio in the presence of a butadiene elastomer.

The butadiene elastomer component constituting the above-mentioned multi-stage copolymer has a glass transition temperature of from −40° C. to 5° C. and is obtained by copolymerizing a monomer mixture comprising 70 to 90% by weight of butadiene, 10 to 30% by weight of an aromatic vinyl monomer and a polyfunctional monomer added in an amount corresponding to 3 to 10 parts by weight per 100 parts by weight of the total amount of said butadiene and aromatic vinyl monomer. As the butadiene component, 1,3-butadiene is preferred, and as the aromatic vinyl monomer, styrene, α-methylstyrene, vinyl toluene, and ring-substituted styrene are exemplified, and these can be used alone or in combination. Of these, styrene is preferable. Further, as the polyfunctional monomer, there are included divinylbenzene, ethylene glycol diacrylate, diethylene glycol diacrylate, triethylene glycol diacrylate, trimethylolpropane triacrylate, ethylene glycol dimethacrylate, diethylene glycol dimethacrylate, 1,3-butylene glycol dimethacrylate, triethylene glycol dimethacrylate, and tetraethylene glycol dimethacrylate, and among these, divinylbenzene and 1,3-butylene glycol dimethacrylate are most preferred.

The composition ratio of butadiene and the aromatic vinyl monomer, which are the constituents of the butadiene elastomer, is within the range as specified above; when it is outside this range, the object of the present invention cannot be fully achieved. The amount of polyfunctional monomer used corresponds to 3 to 10 parts by weight of the above-mentioned range, preferably 3 to 8 parts by weight, whereby the butadiene elastomer can be highly crosslinked and the glass transition temperature can also be kept within the temperature range as specified above, thus improving the falling weight impact resistance, stress-whitening resistance and optical characteristics of the resin composition finally obtained.

The ratio of the butadiene elastomer in the multi-stage copolymer must be 50 parts by weight or more but less than 70 parts by weight to 100 parts by weight of the multi-stage copolymer. When the ratio of the butadiene elastomer is less than 50 parts by weight, the improvement of the falling weight resistance and stress-whitening resistance is not sufficient, and when it is 70 parts by weight or more, the moldability and stress-whitening resistance of the resin composition finally obtained become poorer, and thus the molded products obtained do not have satisfactory surface characteristics.

In the presence of from 50 parts by weight to less than 70 parts by weight of the butadiene elastomer with such a constitution, resin component formable monomers in the range of from more than 30 parts by weight to 50 parts by weight, said resin component formable monomers at a ratio of 25 to 55% by weight of methyl methacrylate, 2 to 15% by weight of an alkyl acrylate (alkyl group having 1 to 8 carbon atoms), and 30 to 60% by weight of an aromatic vinyl monomer (total 100 parts by weight of the butadiene elastomer and resin component formable monomers) are polymerized, and in the practice of the present invention, during the polymerization of the resin component formable monomers, in the first stage methyl methacrylate in an amount corresponding to 45 to 85% by weight of the total amount of methyl methacrylate and the alkyl acrylate in an amount within the range specified above are polymerized, then in the second stage, the aromatic vinyl monomer in an amount specified above is polymerized in the presence of the polymer obtained in the previous stage, and thereafter, in the third stage, only the remainder of methyl methacrylate is polymerized in the presence of the polymers obtained by the first and second polymerizations, to thereby obtain a multi-stage copolymer.

The combined use of methyl methacrylate and an alkyl acrylate in the first stage polymerization improves the flowability of the multi-stage copolymer and prevents the formation of an ungelled product when formulated with a polyvinyl chloride resin, and further, markedly improves the falling weight impact strength of the molded product. The amount of methyl methacrylate must correspond to 45 to 85% by weight of the total amount of methyl methacrylate, preferably 50 to 70% by weight. The use of an amount outside this range reduces the effect of a combined use thereof with an alkyl acrylate, lowers the improvement of the flowability when polymerized into a multi-stage copolymer and when the copolymer is formulated with a polvinyl chloride resin, causes difficulties in the prevention of the formation of ungelled products, and impairs the surface appearance of the molded product. Further, the falling weight impact strength becomes poorer. For this polymerization in the first stage, the relative use ratio of methyl methacrylate and the alkyl acrylate preferably has a relation of a major amount of methyl methacrylate to a minor amount of the alkyl acrylate.

The alkyl acrylate is used only in the polymerization in the first stage, and the amount thereof used is within 2 to 15% by weight of the total amount of the resin component formable monomers. When the amount of the alkyl acrylate used is outside this range, the effect of a combined use thereof with methyl methacrylate will be reduced, the improvement of the flowability when polymerized into a multi-stage copolymer is lowered, and even though it may be formulated with a polyvinyl chloride resin, it becomes difficult to fully prevent a formation of ungelled products, and thus the surface appearance of the molded product is impaired. Further, the falling weight impact strength is unsatisfactory.

The polymerization of an aromatic vinyl monomer in the second stage contributes to an improvement of the surface appearance of the product molded from the resin composition when the resulting multi-stage copolymer is formulated with a polyvinyl chloride resin.

In the polymerization in the third stage, it is important to polymerize only the remainder of methyl methacrylate, which contributes to an improvement of the stress-whitening resistance of the product molded from the resin composition, when the multi-stage copolymer obtained from such a polymerization is formulated with a polyvinyl chloride resin.

When another monomer such as an alkyl acrylate is used in combination during this polymerization in the third stage, the improvement will be lowered.

As the aromatic vinyl monomer which serves as the resin component formable monomer, the aromatic vinyl monomer constituting the above-mentioned butadiene elastomer can be used, and preferably styrene is used.

As the alkyl acrylate, those having an alkyl group having 1 to 8 carbon atoms can be used, and specific examples thereof include methyl acrylate, ethyl acrylate, propyl acrylate, n-butyl acrylate, isobutyl acrylate, tert-butyl acrylate, 2-ethylhexyl acrylate, and n-octyl acrylate, and these can be used alone or in a combination of two or more kinds thereof. Of these alkyl acrylates, preferably ethyl acrylate and n-butyl acrylate are used.

As the polymerization initiator used when preparing the above-mentioned multi-stage copolymer, there can be employed persulfates such as potassium persulfate, ammonium persulfate, and sodium persulfate; organic peroxides such as t-butyl hydroperoxide, cumene hydroperoxide, benzoyl peroxide, lauroyl peroxide, and diisopropylbenzene hydroperoxide; and azo compounds such as azobisisobutyronitrile and azobisisovaleronitrile. Alternatively, the above-mentioned compound can be combined with compounds such as sulfites, hydrogen sulfites, thiosulfates, transition metal salts, sodium formaldehyde sulfoxylate, and dextrose, to be used as the redox system initiator.

An emulsion polymerization is preferred as the polymerization method, and the polymerization is preferably carried out at a temperature of about 40° C. to 80° C., depending on the kind of polymerization initiator used. Known emulsifiers can be used as the emulsifier.

The multi-stage copolymer latex obtained is coagulated by using a coagulant including acids such as sulfuric acid, hydrochloric acid, and phosphoric acid, and/or salts such as calcium chloride and sodium chloride, with or without an addition of an appropriate antioxidant or additives, solidified by heat treatment, followed by dehydration and washing and drying, to be formed into a powdery multi-stage copolymer.

In the present invention, as described above, a polyvinyl chloride resin composition having excellent characteristics, which is the object of the present invention, was obtained for the first time by formulating a multi-stage copolymer with a polyvinyl chloride resin. Said copolymer is obtained by satisfying the combination of using a highly crosslinked butadiene elastomer, polymerizing specific amounts of methyl methacrylate and an alkyl acrylate as the resin formable monomers in the first stage in the presence of the butadiene elastomer, polymerizing only a specific amount of an aromatic vinyl monomer in the second stage, and polymerizing only a specific amount of the remainder of methyl methacrylate in the third stage.

The polyvinyl chloride resin composition of the present invention is obtained by mixing the above-mentioned multi-stage copolymer and polyvinyl chloride resin, in powdery form, by using, for example, a ribbon blender or Henschel mixer, and kneading the resultant mixture by a known kneader or extruder. The method of mixing the polyvinyl chloride resin and the multi-stage copolymer is not limited to such a powder blend, and a polyvinyl chloride resin slurry and a multi-stage copolymer latex may be mixed and formed into a powder via coagulation, solidification, washing, and drying, etc. During the mixing according to these various methods, known stabilizers, plasticizers, processing aids, and colorants can be added, if necessary.

The polyvinyl chloride resin composition of the present invention comprises 100 parts by weight of a polyvinyl chloride resin and 2 to 40 parts of the multi-stage copolymer formulated therewith. When the amount of the multi-stage copolymer is less than 2 parts by weight, the addition has little effect, and when an amount exceeds 40 parts by weight, other excellent inherent characteristics of the polyvinyl chloride resin are liable to be lost.

EXAMPLES

The present invention will now be further illustrated in detail by, but is by no means limited to, the following Examples, wherein "parts" are all by weight unless otherwise noted.

The various characteristics in the Examples and Comparative Examples shown below were measured by the following methods.

(1) Particle Size of Butadiene Elastomer

The average particle size of the butadiene elastomer latex was determined by a transmission electron microscope (JEM-100S, produced by JEOL LTD.

(2) Glass Transition Temperature

The multi-stage copolymer was pressed at 170° C. and 30 kg/cm², and the tanδ determined by using a DYNAMIC MECHANICAL ANALYZER (DMA 982) produced by E. I. du Pont de Nemours and Co., and the peak value of the lower temperature of the two peaks was determined as the glass transition temperature of the butadiene elastomer.

(3) Transparency (Total Light Transmittance, Haze Value)

The formulated resin composition was kneaded at 180° C. for 5 minutes, by 8 inch rolls, and then pressed at 190° C. under a load of 50 kg/cm² for 10 minutes, and using the obtained sample plate having a thickness of 4 mm, an evaluation was conducted based on ASTM-D1003-61.

(4) Falling Weight Impact Strength (Dart Impact at 50% of Breaking Height)

The formulated resin composition was molded into a film having a thickness of 0.10 mm at a resin temperature of 190° C., by an extrusion molding machine with a screw diameter of 40 mm, and was evaluated based on JIS (Japan Industrial Standard)-K7211 by using a 500 g dart weight, and the height at which 50% of the film was broken was determined to be the 50% breaking height.

(5) Stress-Whitening Resistance

The formulated resin composition was formed into a sheet having a thickness of 0.5 mm at a resin temperature of 190° C., by an extrusion molding machine with a screw diameter of 40 mm, and by using a dart with a 1 cm tip diameter of the du Pont impact tester, a dart was permitted to fall from a height of 30 cm under a 500 g load to deform the sheet, and the degree of whitening at the deformed portion was evaluated by the visual assessment.

A . . . Not whitened
B . . . Slightly whitened
C . . . Whitened.

EXAMPLE 1

(1) Synthesis of Butadiene Elastomer (A-1)

| | |
|---|---|
| 1,3-Butadiene | 75 parts |
| Styrene (St) | 25 parts |
| Divinylbenzene (DVB) | 7 parts |
| Diisopropylbenzene hydroperoxide | 0.2 part |
| Sodium pyrophosphate | 0.5 part |
| Ferrous sulfate | 0.01 part |
| Dextrose | 1 part |
| Potassium oleate | 2 parts |
| Deionized water | 200 parts |

The respective components of the above composition were charged into a autoclave, and the reaction was carried out under stirring at 50° C. for 12 hours to prepare a butadiene elastomer (A-1). (Conversion 98%, average particle size 0.08μ, glass transition temperature −15° C.)

(2) Synthesis of Multi-Stage Copolymer (B-1)

A multi-stage copolymer (B-1) was prepared by using the components of the following composition.

| | |
|---|---|
| Butadiene elastomer (A-1) (as solids) | 65 parts |
| St | 15 parts |
| Methyl methacrylate (MMA) | 17 parts |
| Ethyl acrylate (EA) | 3 parts |
| Potassium oleate | 1.2 parts |
| Cumene hydroperoxide | 0.7 part |
| Rongalite (sodium formaldehye sulfoxylate) | 0.5 part |
| Deionized water (as a whole) | 200 parts |

Of the components of the above composition, the butadiene elastomer (A-1), potassium oleate, Rongalite and deionized water were charged into a flask charged with nitrogen, the inner temperature thereof was maintained at 70° C., and in the first stage, a mixture of 11 parts of MMA, 3 parts of EA, and 0.28 part of cumene hydroperoxide was dropwise added over 20 minutes and held therein for 1 hour.

Then, in the presence of the polymer obtained in the previous stage, in the second stage, a mixture of 15 parts of St and 0.3 part of cumene hydroperoxide was continuously added dropwise over one hour, and held therein for 2 hours.

Thereafter, in the presence of the polymers obtained in the first stage and the second stage, in the third stage, a mixture of 6 parts of MMA and 0.12 part of cumene hydroperoxide was added dropwise over 50 minutes and held therein for one hour, to thus complete the polymerization to obtain a multi-stage copolymer latex.

After 0.5 part of butylated hydroxytoluene (BHT) was added to the multi-stage copolymer latex, a 0.2 wt % aqueous sulfuric acid solution was added to coagulate the copolymer, followed by a solidification by a heat treatment at 90° C. Then, the coagulated product was washed with warm water and dried, to thus obtain multi-stage copolymer powder.

(3) Preparation of Polyvinyl Chloride Resin Composition

The respective components of 100 parts of a polyvinyl chloride resin with an average polymerization degree of 700, 3 parts of dioctyltin mercaptide as the stabilizer, 2 parts of Metablene ®P-550 (produced by Mitsubishi Rayon Co., Ltd.) as the lubricant, 1 part of Metablene ®P-710 (produced by Mitsubishi Rayon Co., Ltd.) as the lubricant, and 10 parts of the multi-stage copolymer powder obtained in the above (2) were mixed by a Henschel mixer till 110° C. for 10 minutes, to obtain a polyvinyl chloride resin composition.

Then, the physical properties of the composition obtained were measured, and the results are shown in Table 1.

EXAMPLE 2

(1) Synthesis of Butadiene Elastomer (A-2)

| | |
|---|---|
| Bd | 80 parts |
| St | 20 parts |
| DVB | 5 parts |
| Diisopropylbenzene hydroperoxide | 0.2 part |
| Sodium pyrophosphate | 0.5 part |
| Ferrous sulfate | 0.01 part |
| Dextrose | 1 part |
| Potassium oleate | 2 parts |
| Deionized water | 200 parts |

The respective components of the above composition were charged into an autoclave, and the reaction was carried out under stirring at 50° C. for 12 hours, to prepare a butadiene elastomer (A-2). (Conversion 98%, average particle size 0.08μ, glass transition temperature −23° C.)

(2) Synthesis of Multi-Stage Copolymer (B-2)

A multi-stage copolymer (B-2) was prepared by using the components of the following composition.

| | |
|---|---|
| Butadiene elastomer (A-2) (as a solid) | 60 parts |
| St | 16 parts |
| MMA | 20 parts |
| EA | 4 parts |
| Potassium oleate | 1.2 parts |
| Cumene hydroperoxide | 0.8 part |
| Rongalite | 0.6 part |

| | |
|---|---|
| Deionized water (as a whole) | 200 parts |

Of the components of the above composition, the butadiene elastomer (A-2), potassium oleate, Rongalite and deionized water were charged into a flask charged with nitrogen and the inner temperature thereof maintained at 70° C., and in the first stage, a mixture of 14 parts of MMA, 4 parts of EA and 0.36 part of cumene hydroperoxide was dropwise added over 20 minutes and held therein for 1 hour.

Then, in the presence of the polymer obtained in the previous stage, in the second stage, a mixture of 16 parts of St and 0.32 part of cumene hydroperoxide was continuously added dropwise over one hour and held therein for 2 hours.

Thereafter, in the presence of the polymers obtained in the first stage and the second stage, in the third stage, a mixture of 6 parts of MMA and 0.12 part of cumene hydroperoxide was added dropwise over 50 minutes and held therein one hour, to thus complete the polymerization to obtain a multi-stage copolymer latex.

After 0.5 part of BHT was added to the multi-stage copolymer latex, an aqueous solution of sulfuric acid in a concentration of 0.2% by weight was added to coagulate the copolymer, followed by a solidification by a heat treatment at 90° C. Then, the coagulated product was washed with warm water and dried, to thus obtain a multi-stage copolymer powder.

(3) Preparation of Polyvinyl Chloride Resin Composition

A polyvinyl chloride resin composition was prepared under the same conditions as in Example 1, except that the multi-stage copolymer (B-2) was used in place of the multi-stage copolymer powder (B-1).

The physical properties of the composition obtained were measured, and the results are shown in Table 1.

EXAMPLE 3

(1) Synthesis of Butadiene Elastomer (A-3)

| | |
|---|---|
| Bd | 80 parts |
| St | 20 parts |
| DVB | 6 parts |
| Diisopropylbenzene hydroperoxide | 0.2 part |
| Sodium pyrophosphate | 0.5 part |
| Ferrous sulfate | 0.01 part |
| Dextrose | 1 part |
| Potassium oleate | 2 parts |
| Deionized water | 200 parts |

The respective components of the above composition were charged into an autoclave, and the reaction was carried out under stirring at 50° C. for 12 hours to prepare a butadiene elastomer (A-3). (Conversion 98%, average particle size 0.08μ, glass transition temperature −20° C.)

(2) Synthesis of Multi-Stage Copolymer (B-3)

A multi-stage copolymer (B-3) was prepared by using the components of the following composition.

| | |
|---|---|
| Butadiene elastomer (A-3) (as a solid) | 65 parts |
| St | 15 parts |
| MMA | 17 parts |
| EA | 3 parts |
| Potassium oleate | 1.2 parts |
| Cumene hydroperoxide | 0.7 part |
| Rongalite | 0.5 part |
| Deionized water (as a whole) | 200 parts |

Of the components of the above composition, the butadiene elastomer (A-3), potassium oleate, Rongalite, and deionized water were charged into a flask charged with nitrogen and the inner temperature thereof maintained at 70° C., and in the first stage, a mixture of 13 parts of MMA, 3 parts of EA, and 0.32 part of cumene hydroperoxide was dropwise added over 20 minutes and held therein for 1 hour.

Then, in the presence of the polymer obtained in the previous stage, in the second stage, a mixture of 15 parts of St and 0.3 part of cumene hydroperoxide was continuously added dropwise over one hour and held therein for 2 hours.

Thereafter, in the presence of the polymers obtained in the first stage and the second stage, in the third stage, a mixture of 4 parts of MMA and 0.08 part of cumene hydroperoxide was added dropwise over 50 minutes and held therein for one hour, to thus complete the polymerization to obtain a multi-stage copolymer latex.

After 0.5 part of BHT was added to the multi-stage copolymer latex, a 0.2 wt % aqueous sulfuric acid solution was added to coagulate the copolymer, followed by a solidification by a heat treatment at 90° C. Then, the coagulated product was washed with warm water and dried, to thereby obtain a multi-stage copolymer powder.

(3) Preparation of Polyvinyl Chloride Resin Composition

A polyvinyl chloride resin composition was prepared under the same conditions as in Example 1, except that the multi-stage copolymer (B-3) was used in place of the multi-stage copolymer powder (B-1).

The physical properties of the composition obtained were measured, and the results are shown in Table 1.

EXAMPLE 4

(1) Synthesis of Butadiene Elastomer (A-4)

| | |
|---|---|
| Bd | 85 parts |
| St | 15 parts |
| DVB | 8 parts |
| Diisopropylbenzene hydroperoxide | 0.2 part |
| Sodium pyrophosphate | 0.5 part |
| Ferrous sulfate | 0.01 part |
| Dextrose | 1 part |
| Potassium oleate | 2 parts |
| Deionized water | 200 parts |

The respective components of the above composition were charged into an autoclave, and the reaction was carried out under stirring at 50° C. for 12 hours to prepare a butadiene elastomer (A-4). (Conversion 98%, average particle size 0.08μ, glass transition temperature −26° C.)

(2) Synthesis of Multi-Stage Copolymer (B-4)

A multi-stage copolymer (B-4) was prepared by using the components of the following composition.

| | |
|---|---|
| Butadiene elastomer (A-4) (as solids) | 63 parts |
| St | 18 parts |
| MMA | 15 parts |
| EA | 4 parts |
| Potassium oleate | 1.2 parts |
| Cumene hydroperoxide | 0.74 part |
| Rongalite | 0.5 part |
| Deionized water (as a whole) | 200 parts |

Of the components of the above composition, the butadiene elastomer (A-4), potassium oleate, Rongalite, and deionized water were charged into a flask charged with nitrogen, and the inner temperature thereof maintained at 70° C., and in the first stage, a mixture of 12 parts of MMA, 4 parts of EA, and 0.32 part of cumene hydroperoxide was dropwise added over 20 minutes and held therein for 1 hour.

Then, in the presence of the polymer obtained in the previous stage, in the second stage, a mixture of 18 parts of St and 0.36 part of cumene hydroperoxide was continuously added dropwise over one hour and held therein for 2 hours.

Thereafter, in the presence of the polymers obtained in the first stage and the second stage, in the third stage, a mixture of 3 parts of MMA and 0.06 part of cumene hydroperoxide was added dropwise over 50 minutes and held therein for one hour, to thereby complete the polymerization to obtain a multi-stage copolymer latex.

After 0.5 part of BHT was added to the multi-stage copolymer latex, a 0.2 wt % aqueous sulfuric acid solution was added to coagulate the copolymer, followed by a solidification by a heat treatment at 90° C. Then, the coagulated product was washed with warm water and dried, to thus obtain a multi-stage copolymer powder.

(3) Preparation of Polyvinyl Chloride Resin Composition

A polyvinyl chloride resin composition was prepared under the same conditions as in Example 1 except that the multi-stage copolymer (B-4) was used in place of the multi-stage copolymer powder (B-1).

The physical properties of the composition obtained were measured, and the results are shown in Table 1.

EXAMPLE 5

(1) Synthesis of Butadiene Elastomer (A-5)

| | |
|---|---|
| Bd | 85 parts |
| St | 15 parts |
| DVB | 4 parts |
| Diisopropylbenzene hydroperoxide | 0.2 part |
| Sodium pyrophosphate | 0.5 part |
| Ferrous sulfate | 0.01 part |
| Dextrose | 1 part |
| Potassium oleate | 2 parts |
| Deionized water | 200 parts |

The respective components of the above composition were charged into an autoclave, and the reaction was carried out under stirring at 50° C. for 12 hours to prepare a butadiene elastomer (A-5). (Conversion 98%, average particle size 0.08μ, glass transition temperature −33° C.)

(2) Synthesis of Multi-Stage Copolymer (B-5)

A multi-stage copolymer (B-5) was prepared by using the components of the following composition.

| | |
|---|---|
| Butadiene elastomer (A-5) (as solids) | 65 parts |
| St | 20 parts |
| MMA | 10 parts |
| EA | 5 parts |
| Potassium oleate | 1.2 parts |
| Cumene hydroperoxide | 0.7 part |
| Rongalite | 0.5 part |
| Deionized water (as a whole) | 200 parts |

Of the components of the above composition, the butadiene elastomer (A-5), potassium oleate, Rongalite, and deionized water were charged into a flask charged with nitrogen, and the inner temperature thereof maintained at 70° C., and in the first stage, a mixture of 6 parts of MMA, 5 parts of EA and 0.22 part of cumene hydroperoxide was dropwise added over 20 minutes and held therein for 1 hour.

Then, in the presence of the polymer obtained in the previous stage, in the second stage, a mixture of 20 parts of St and 0.4 part of cumene hydroperoxide was continuously added dropwise over one hour and held therein for 2 hours.

Thereafter, in the presence of the polymers obtained in the first stage and the second stage, in the third stage, a mixture of 4 parts of MMA and 0.08 part of cumene hydroperoxide was added dropwise over 50 minutes and held therein for one hour, to thereby complete the polymerization to obtain a multi-stage copolymer latex.

After 0.5 part of BHT was added to the multi-stage copolymer latex, a 0.2 wt % aqueous sulfuric acid solution was added to coagulate the copolymer, followed by a solidification by a heat treatment at 90° C. Then, the coagulated product was washed with warm water and dried, to thus obtain a multi-stage copolymer powder.

(3) Preparation of Polyvinyl Chloride Resin composition

A polyvinyl chloride resin composition was prepared under the same conditions as in Example 1, except that the multi-stage copolymer (B-5) was used in place of the multi-stage copolymer powder (B-1).

The physical properties of the composition obtained were measured, and the results are shown in Table 1.

EXAMPLE 6

(1) Synthesis of Butadiene Elastomer (A-6)

| | |
|---|---|
| Bd | 80 parts |
| St | 20 parts |
| 1,3-Butylene glycol dimethacrylate (1,3-BD) | 5 parts |
| Diisopropylbenzene hydroperoxide | 0.2 part |
| Sodium pyrophosphate | 0.5 part |
| Ferrous sulfate | 0.01 part |
| Dextrose | 1 part |
| Potassium oleate | 2 parts |
| Deionized water | 200 parts |

The respective components of the above composition were charged into an autoclave, and the reaction was carried out under stirring at 50° C. for 12 hours to prepare a butadiene elastomer (A-6). (Conversion 98%, average particle size 0.08μ, glass transition temperature −25° C.)

(2) Synthesis of Multi-Stage Copolymer (B-6)

A multi-stage copolymer (B-6) was prepared by using the components of the following composition.

| Butadiene elastomer (A-6) (as solids) | 60 parts |
|---|---|
| St | 23 parts |
| MMA | 14 parts |
| EA | 3 parts |
| Potassium oleate | 1.2 parts |
| Cumene hydroperoxide | 0.8 part |
| Rongalite | 0.5 part |
| Deionized water (as a whole) | 200 parts |

Of the components of the above composition, the butadiene elastomer (A-6), potassium oleate, Rongalite, and deionized water were charged into a flask charged with nitrogen, and the inner temperature thereof maintained at 70° C., and in the first stage, a mixture of 10 parts of MMA, 3 parts of EA and 0.26 part of cumene hydroperoxide was dropwise added over 20 minutes and held therein for 1 hour.

Then, in the presence of the polymer obtained in the previous stage, in the second stage, a mixture of 23 parts of St and 0.46 part of cumene hydroperoxide was continuously added dropwise over one hour and held therein for 2 hours.

Thereafter, in the presence of the polymers obtained in the first stage and the second stage, in the third stage, a mixture of 4 parts of MMA and 0.08 part of cumene hydroperoxide was added dropwise over 50 minutes and held therein for one hour, to thereby complete the polymerization to obtain a multi-stage copolymer latex.

After 0.5 part of BHT was added to the multi-stage copolymer latex, a 0.2 wt % aqueous sulfuric acid solution was added to coagulate the copolymer, followed by a solidification by a heat treatment at 90° C. Then, the coagulated product was washed with warm water and dried, to thus obtain a multi-stage copolymer powder.

(3) Preparation of Polyvinyl Chloride Resin Composition

A polyvinyl chloride resin composition was prepared under the same conditions as in Example 1 except that the multi-stage copolymer (B-6) was used in place of the multi-stage copolymer powder (B-1).

The physical properties of the composition obtained were measured, and the results are shown in Table 1.

EXAMPLE 7

(1) Synthesis of Butadiene Elastomer (A-7)

| Bd | 75 parts |
|---|---|
| St | 25 parts |
| 1,3-BD | 8 parts |
| Diisopropylbenzene hydroperoxide | 0.2 part |
| Sodium pyrophosphate | 0.5 part |
| Ferrous sulfate | 0.01 part |
| Dextrose | 1 part |
| Potassium oleate | 2 parts |
| Deionized water | 200 parts |

The respective components of the above composition were charged into an autoclave, and the reaction was carried out under stirring at 50° C. for 12 hours to prepare a butadiene elastomer (A-7). (Conversion 98%, average particle size 0.08μ, glass transition temperature −15° C.)

(2) Synthesis of Multi-Stage Copolymer (B-7)

A multi-stage copolymer (B-7) was prepared by using the components of the following composition.

| Butadiene elastomer (A-7) (as solids) | 65 parts |
|---|---|
| St | 15 parts |
| MMA | 16 parts |
| EA | 4 parts |
| Potassium oleate | 1.2 parts |
| Cumene hydroperoxide | 0.7 part |
| Rongalite | 0.5 part |
| Deionized water (as a whole) | 200 parts |

Of the components of the above composition, the butadiene elastomer (A-7), potassium oleate, Rongalite, and deionized water were charged into a flask charged with nitrogen, and the inner temperature thereof maintained at 70° C., and in the first stage, a mixture of 11 parts of MMA, 4 parts of EA and 0.3 part of cumene hydroperoxide was dropwise added over 20 minutes and held therein for 1 hour.

Then, in the presence of the polymer obtained in the previous stage, in the second stage, a mixture of 15 parts of St and 0.3 part of cumene hydroperoxide was continuously added dropwise over one hour and held therein for 2 hours.

Thereafter, in the presence of the polymers obtained in the first stage and the second stage, in the third stage, a mixture of 5 parts of MMA and 0.1 part of cumene hydroperoxide was added dropwise over 50 minutes and held therein for one hour, to thereby complete the polymerization to obtain a multi-stage copolymer latex.

After 0.5 part of BHT was added to the multi-stage copolymer latex, a 0.2 wt % aqueous sulfuric acid solution was added to coagulate the copolymer, followed by a solidification by a heat treatment at 90° C. Then, the coagulated product was washed with warm water and dried, to thus obtain a multi-stage copolymer powder.

(3) Preparation of Polyvinyl Chloride Resin Composition

A polyvinyl chloride type resin composition was prepared under the same conditions as in Example 1 except that the multi-stage copolymer (B-7) was used in place of the multi-stage copolymer powder (B-1).

The physical properties of the composition obtained were measured, and the results are shown in Table 1.

COMPARATIVE EXAMPLE 1

(1) Synthesis of Butadiene Elastomer (A'-1)

| Bd | 75 parts |
|---|---|
| St | 25 parts |
| Diisopropylbenzene hydroperoxide | 0.2 part |
| Sodium pyrophosphate | 0.5 part |
| Ferrous sulfate | 0.01 part |
| Dextrose | 1 part |
| Potassium oleate | 2 parts |
| Deionized water | 200 parts |

The respective components of the above composition were charged into an autoclave, and the reaction was carried out under stirring at 50° C. for 12 hours to prepare a butadiene elastomer (A'-1). (Conversion 98%, average particle size 0.08μ, glass transition temperature −28° C.)

(2) Synthesis of Multi-Stage Copolymer (B'-1)

A multi-stage copolymer (B'-1) was prepared by using the components of the following composition.

| | |
|---|---|
| Butadiene elastomer (A'-1) (as solids) | 65 parts |
| St | 16 parts |
| MMA | 14 parts |
| EA | 5 parts |
| Potassium oleate | 1.2 parts |
| Cumene hydroperoxide | 0.7 part |
| Rongalite | 0.5 part |
| Deionized water (as a whole) | 200 parts |

Of the components of the above composition, the butadiene elastomer (A'-1), potassium oleate, Rongalite, and deionized water were charged into a flask charged with nitrogen, and the inner temperature thereof maintained at 70° C., and in the first stage, a mixture of 10 parts of MMA, 3 parts of EA, and 0.26 part of cumene hydroperoxide was dropwise added over 20 minutes and held therein for 1 hour.

Then, in the presence of the polymer obtained in the previous stage, in the second stage, a mixture of 16 parts of St and 0.32 part of cumene hydroperoxide was continuously added dropwise over one hour and held therein for 2 hours.

Thereafter, in the presence of the polymers obtained in the first stage and the second stage, in the third stage, a mixture of 4 parts of MMA, 2 parts of EA, and 0.12 part of cumene hydroperoxide was added dropwise over 50 minutes and held therein for one hour, to thereby complete the polymerization to obtain a multi-stage copolymer latex.

After 0.5 part of butylated hydroxytoluene (BHT) was added to the multi-stage copolymer later, a 0.2 wt % aqueous sulfuric acid solution was added to coagulate the copolymer, followed by a solidification by a heat treatment at 90° C. Then, the coagulated product was washed with warm water and dried, to thus obtain a multi-stage copolymer powder.

(3) Preparation of Polyvinyl Chloride Resin Composition

The respective components of 100 parts of a polyvinyl chloride resin with an average polymerization degree of 700, 3 parts of dioctyltin mercaptide as the stabilizer, 2 parts of Metablene ®P-550 (produced by Mitsubishi Rayon Co., Ltd.) as the lubricant, 1 part of Metablene ®P-710 (produced by Mitsubishi Rayon Co., Ltd.) as the lubricant, and 10 parts of the multi-stage copolymer powder obtained in the above (2) were mixed by a Henschel mixer till 110° C. for 10 minutes, to thus obtain a polyvinyl chloride resin composition.

The physical properties of the composition obtained were measured, and the results are shown in Table 2.

COMPARATIVE EXAMPLE 2

(1) Synthesis of Butadiene Elastomer (A'-2)

| | |
|---|---|
| Bd | 75 parts |
| St | 25 parts |
| Diisopropylbenzene hydroperoxide | 0.2 part |
| Sodium pyrophosphate | 0.5 part |

-continued

| | |
|---|---|
| Ferrous sulfate | 0.01 part |
| Dextrose | 1 part |
| Potassium oleate | 2 parts |
| Deionized water | 200 parts |

The respective components of the above composition were charged into an autoclave, and the reaction was carried out under stirring at 50° C. for 12 hours to prepare a butadiene elastomer (A'-2). (Conversion 98%, average particle size 0.08μ, glass transition temperature −28° C.)

(2) Synthesis of Multi-Stage Copolymer (B'-2)

A multi-stage copolymer (B'-2) was prepared by using the components of the following composition.

| | |
|---|---|
| Butadiene elastomer (A'-2) (as solids) | 65 parts |
| St | 15 parts |
| MMA | 20 parts |
| Potassium oleate | 1.2 parts |
| Cumene hydroperoxide | 0.7 part |
| Rongalite | 0.5 part |
| Deionized water (as a whole) | 200 parts |

Of the components of the above composition, the butadiene elastomer (A'-2), potassium oleate, Rongalite, and deionized water were charged into a flask charged with nitrogen, and the inner temperature thereof was maintained at 70° C., and in the first stage, a mixture of 10 parts of MMA, 15 parts of St, and 0.50 part of cumene hydroperoxide was dropwise added over one hour and held therein for 2 hours.

Then, in the presence of the polymer obtained in the previous stage, in the second stage, a mixture of 10 parts of MMA and 0.2 part of cumene hydroperoxide was continuously added dropwise over one hour and held therein for one hour, to thereby complete the polymerization to obtain a multi-stage copolymer latex.

After 0.5 part of BHT was added to the multi-stage copolymer latex, a 0.2 wt % aqueous sulfuric acid solution was added to coagulate the copolymer, followed by a solidification by a heat treatment at 90° C. Then, the coagulated product was washed with warm water and dried, to thus obtain a multi-stage copolymer powder.

(3) Preparation of Polyvinyl Chloride Resin Composition

A polyvinyl chloride resin composition was prepared under the same conditions as in Comparative Example 1, except that the multi-stage copolymer (B'-2) was used in place of the multi-stage copolymer powder (B'-1).

The physical properties of the composition obtained were measured, and the results are shown in Table 2.

COMPARATIVE EXAMPLE 3

(1) Synthesis of Butadiene Elastomer (A'-3)

| | |
|---|---|
| Bd | 90 parts |
| St | 10 parts |
| DVB | 1 part |
| Diisopropylbenzene hydroperoxide | 0.2 part |
| Sodium pyrophosphate | 0.5 part |
| Ferrous sulfate | 0.01 part |
| Dextrose | 1 part |
| Potassium oleate | 2 parts |

-continued

| | |
|---|---|
| Deionized water | 200 parts |

The respective components of the above composition were charged into an autoclave, and the reaction was carried out under stirring at 50° C. for 12 hours to prepare a butadiene elastomer (A'-3). (Conversion 98%, average particle size 0.08μ, glass transition temperature −43° C.)

(2) Synthesis of Multi-Stage Copolymer (B'-3)

A multi-stage copolymer (B'-3) was prepared by using the components of the following composition.

| | |
|---|---|
| Butadiene elastomer (A'-3) (as a solid) | 60 parts |
| St | 25 parts |
| MMA | 15 parts |
| Potassium oleate | 1.2 parts |
| Cumene hydroperoxide | 0.8 part |
| Rongalite | 0.6 part |
| Deionized water (as a whole) | 200 parts |

Of the components of the above composition, the butadiene elastomer (A'-3), potassium oleate, Rongalite, and deionized water were charged into a flask charged with nitrogen, and the inner temperature thereof maintained at 70° C., and in the first stage, a mixture of 15 parts of MMA and 0.30 part of cumene hydroperoxide was dropwise added over 20 minutes and held therein for 1 hour. Then, in the presence of the polymer obtained in the previous stage, in the second stage a mixture of 25 parts of St and 0.5 part of cumene hydroperoxide was continuously added dropwise over one hour and held therein for one hour, to thereby complete the polymerization to obtain a multi-stage copolymer latex. After 0.5 part of BHT was added to the multi-stage copolymer latex, a 0.2 wt % aqueous sulfuric acid solution was added to coagulate the copolymer, followed by a solidification by a heat treatment at 90° C. Then, the coagulated product was washed with warm water dried, to thus obtain a multi-stage copolymer powder.

(3) Preparation of Polyvinyl Chloride Resin Composition

A polyvinyl chloride resin composition was prepared under the same conditions as in Comparative Example 1 except that the multi-stage copolymer (B'-3) was used in place of the multi-stage copolymer powder (B'-1).

The physical properties of the composition obtained were measured, and the results are shown in Table 2.

COMPARATIVE EXAMPLE 4

(1) Synthesis of Butadiene Elastomer (A'-4)

| | |
|---|---|
| Bd | 85 parts |
| St | 15 parts |
| DVB | 1 part |
| Diisopropylbenzene hydroperoxide | 0.2 part |
| Sodium pyrophosphate | 0.5 part |
| Ferrous sulfate | 0.01 part |
| Dextrose | 1 part |
| Potassium oleate | 2 parts |
| Deionized water | 200 parts |

The respective components of the above composition were charged into an autoclave, and the reaction was carried out under stirring at 50° C. for 12 hours to prepare a butadiene elastomer (A'-4). (Conversion 98%, average particle size 0.08μ, glass transition temperature −38° C.)

(2) Synthesis of Multi-Stage Copolymer (B'-4)

A multi-stage copolymer (B'-4) was prepared by using the components of the following composition.

| | |
|---|---|
| Butadiene elastomer (A'-4) (as solids) | 60 parts |
| St | 23 parts |
| MMA | 15 parts |
| EA | 2 parts |
| Potassium oleate | 1.2 parts |
| Cumene hydroperoxide | 0.8 part |
| Rongalite | 0.6 part |
| Deionized water (as a whole) | 200 parts |

Of the components of the above composition, the butadiene elastomer (A'-4), potassium oleate, Rongalite, and deionized water were charged into a flask charged with nitrogen, and the inner temperature thereof maintained at 70° C., and in the first stage, a mixture of 10 parts of MMA, 2 parts of EA and 0.24 part of cumene hydroperoxide was dropwise added over 20 minutes and held therein for 1 hour.

Then, in the presence of the polymer obtained in the previous stage, in the second stage, a mixture of 23 parts of St and 0.46 part of cumene hydroperoxide was continuously added dropwise over one hour and held therein for 2 hours.

Thereafter, in the presence of the polymers obtained in the first stage and the second stage, in the third stage, a mixture of 5 parts of MMA and 0.10 part of cumene hydroperoxide was added dropwise over 50 minutes and held therein for one hour, to thereby complete the polymerization to obtain a multi-stage copolymer latex.

After 0.5 part of BHT was added to the multi-stage copolymer latex, a 0.2 wt % aqueous sulfuric acid solution was added to coagulate the copolymer, followed by a solidification by a heat treatment at 90° C. Then, the coagulated product was washed with warm water and dried, to thus obtain a multi-stage copolymer powder.

(3) Preparation of Polyvinyl Chloride Resin Composition

A polyvinyl chloride resin composition was prepared under the same conditions as in Comparative Example 1 except that the multi-stage copolymer (B'-4) was used in place of the multi-stage copolymer powder (B'-1).

The physical properties of the composition obtained were measured, and the results are shown in Table 2.

COMPARATIVE EXAMPLE 5

(1) Synthesis of Butadiene Elastomer (A'-5)

| | |
|---|---|
| Bd | 80 parts |
| St | 20 parts |
| DVB | 5 parts |
| Diisopropylbenzene hydroperoxide | 0.2 part |
| Sodium pyrophosphate | 0.5 part |
| Ferrous sulfate | 0.01 part |
| Dextrose | 1 part |
| Potassium oleate | 2 parts |
| Deionized water | 200 parts |

The respective components of the above composition were charged into an autoclave, and the reaction was carried out under stirring at 50° C. for 12 hours to prepare a butadiene elastomer (A'-5). (Conversion 98%, average particle size 0.08μ, glass transition temperature −25° C.)

(2) Synthesis of Multi-Stage Copolymer (B'-5)

A multi-stage copolymer (B'-5) was prepared by using the components of the following composition.

| | |
|---|---|
| Butadiene elastomer (A'-5) (as solids) | 80 parts |
| St | 8 parts |
| MMA | 12 parts |
| Potassium oleate | 1.2 parts |
| Cumene hydroperoxide | 0.4 part |
| Rongalite | 0.3 part |
| Deionized water (as a whole) | 200 parts |

Of the components of the above composition, the butadiene type elastomer (A'-5), potassium oleate, Rongalite, and deionized water were charged into a flask charged with nitrogen, and the inner temperature thereof maintained at 70° C., and in the first stage, a mixture of 9 parts of MMA and 0.18 part of cumene hydroperoxide was dropwise added over 20 minutes and held therein for 1 hour.

Then, in the presence of the polymer obtained in the previous stage, in the second stage, a mixture of 8 parts of St and 0.16 part of cumene hydroperoxide was continuously added dropwise over one hour and held therein for 2 hours.

Thereafter, in the presence of the polymers obtained in the first stage and the second stage, in the third stage, a mixture of 3 parts of MMA and 0.6 part of cumene hydroperoxide was added dropwise over 50 minutes and held therein for one hour, to thereby complete the polymerization to obtain a multi-stage copolymer.

After 0.5 part of BHT was added to the multi-stage copolymer latex, a 0.2 wt % aqueous sulfuric acid solution was added to coagulate the copolymer, followed by a solidification by a heat treatment at 90° C. Then, the coagulated product was washed with warm water and dried, to thus obtain a multi-stage copolymer powder.

(3) Preparation of polyvinyl chloride resin Composition

A polyvinyl chloride resin composition was prepared under the same conditions as in Comparative Example 1 except that the multi-stage copolymer (B'-5) was used in place of the multi-stage copolymer powder (B'-1).

The physical properties of the composition obtained were measured, and the results are shown in Table 2.

COMPARATIVE EXAMPLE 6

(1) Synthesis of Butadiene Elastomer (A'-6)

| | |
|---|---|
| Bd | 75 parts |
| St | 25 parts |
| DVB | 6 parts |
| Diisopropylbenzene hydroperoxide | 0.2 part |
| Sodium pyrophosphate | 0.5 part |
| Ferrous sulfate | 0.01 part |
| Dextrose | 1 part |
| Potassium oleate | 2 parts |
| Deionized water | 200 parts |

The respective components of the above composition were charged into an autoclave, and the reaction was carried out under stirring at 50° C. for 12 hours to prepare a butadiene elastomer (A'-6). (Conversion 98%, average particle size 0.08μ, glass transition temperature −17° C.)

(2) Synthesis of Multi-Stage Copolymer (B'-6)

A multi-stage copolymer (B'-6) was prepared by using the components of the following composition.

| | |
|---|---|
| Butadiene elastomer (A'-6) (as solids) | 65 parts |
| St | 15 parts |
| MMA | 14 parts |
| EA | 6 parts |
| Potassium oleate | 1.2 parts |
| Cumene hydroperoxide | 0.7 part |
| Rongalite | 0.5 part |
| Deionized water (as a whole) | 200 parts |

Of the components of the above composition, the butadiene elastomer (A'-6), potassium oleate, Rongalite, and deionized water were charged into a flask charged with nitrogen, and the inner temperature thereof maintained at 70° C., and in the first stage, a mixture of 11 parts of MMA, 3 parts of EA and 0.28 part of cumene hydroperoxide was dropwise added over 20 minutes and held therein for 1 hour.

Then, in the presence of the polymer obtained in the previous stage, in the second stage, a mixture of 15 parts of St and 0.3 part of cumene hydroperoxide was continuously added dropwise over one hour and held therein for 2 hours.

Thereafter, in the presence of the polymers obtained in the first stage and the second stage, in the third stage, a mixture of 3 parts of MMA, 3 parts of EA and 0.12 part of cumene hydroperoxide was added dropwise over 50 minutes and held therein for one hour, to thereby complete the polymerization to obtain a multi-stage copolymer latex.

After 0.5 part of BHT was added to the multi-stage copolymer latex, a 0.2 wt % aqueous sulfuric acid solution was added to coagulate the copolymer, followed by a solidification by a heat treatment at 90° C. Then, the coagulated product was washed with warm water and dried, to thus obtain a multi-stage copolymer powder.

(3) Preparation of Polyvinyl Chloride Resin Composition

A polyvinyl chloride type resin composition was prepared under the same conditions as in Comparative Example 1 except that the multi-stage copolymer (B'-6) was used in place of the multi-stage copolymer powder (B'-1).

The physical properties of the composition obtained were measured, and the results are shown in Table 2.

COMPARATIVE EXAMPLE 7

(1) Synthesis of Butadiene Elastomer (A'-7)

| | |
|---|---|
| Bd | 75 parts |
| St | 25 parts |
| DVB | 8 parts |
| Diisopropylbenzene hydroperoxide | 0.2 part |
| Sodium pyrophosphate | 0.5 part |
| Ferrous sulfate | 0.01 part |
| Dextrose | 1 part |
| Potassium oleate | 2 parts |
| Deionized water | 200 parts |

The respective components of the above composition were charged into an autoclave, and the reaction was carried out under stirring at 50° C. for 12 hours to prepare a butadiene elastomer (A'-7). (Conversion 98%, average particle size 0.08μ, glass transition temperature −13° C.)

(2) Synthesis of Multi-Stage Copolymer (B'-7)

A multi-stage copolymer (B'-7) was prepared by using the components of the following composition.

| Butadiene elastomer (A'-7) (as solids) | 65 parts |
|---|---|
| St | 14 parts |
| MMA | 21 parts |
| Potassium oleate | 1.2 parts |
| Cumene hydroperoxide | 0.7 part |
| Rongalite | 0.5 part |
| Deionized water (as a whole) | 200 parts |

Of the components of the above composition, the butadiene elastomer (A'-7), potassium oleate, Rongalite, and deionized water were charged into a flask charged with nitrogen, and the inner temperature thereof maintained at 70° C., and in the first stage, a mixture of 6 parts of MMA, 14 parts of St and 0.40 part of cumene hydroperoxide was dropwise added over one hour and held therein for 1 hour.

Then, in the presence of the polymer obtained in the previous stage, in the second stage, a mixture of 15 parts of MMA and 0.30 part of cumene hydroperoxide was added dropwise over 50 minutes and held therein for 2 hours, to thereby complete the polymerization to obtain a multi-stage copolymer latex.

After 0.5 part of BHT was added to the multi-stage copolymer latex, a 0.2 wt % aqueous sulfuric acid solution was added to coagulate the copolymer, followed by a solidification by a heat treatment at 90° C. Then, the coagulated product was washed with warm water and dried, to thus obtain a multi-stage copolymer powder.

(3) Preparation of Polyvinyl Chloride Resin Composition

A polyvinyl chloride resin composition was prepared under the same conditions as in Comparative Example 1 except that the multi-stage copolymer (B'-7) was used in place of the multi-stage copolymer powder (B'-7).

The physical properties of the composition obtained were measured, and the results are shown in Table 2.

COMPARATIVE EXAMPLE 8

(1) Synthesis of Butadiene Elastomer (A'-8)

| Bd | 80 parts |
|---|---|
| St | 20 parts |
| 1,3-BD | 1 part |
| Diisopropylbenzene hydroperoxide | 0.2 part |
| Sodium pyrophosphate | 0.5 part |
| Ferrous sulfate | 0.01 part |
| Dextrose | 1 part |
| Potassium oleate | 2 parts |
| Deionized water | 200 parts |

The respective components of the above composition were charged into an autoclave, and the reaction was carried out under stirring at 50° C. for 12 hours to prepare a butadiene type elastomer (A'-8). (Conversion 98%, average particle size 0.08μ, glass transition temperature −32° C.)

(2) Synthesis of Multi-State Copolymer (B'-8)

A multi-stage copolymer (B'-8) was prepared by using the components of the following composition.

| Butadiene elastomer (A'-8) (as solids) | 65 parts |
|---|---|
| St | 16 parts |
| MMA | 15 parts |
| EA | 4 parts |
| Potassium oleate | 1.2 parts |
| Cumene hydroperoxide | 0.8 part |
| Rongalite | 0.5 part |
| Deionized water (as a whole) | 200 parts |

Of the components of the above composition, the butadiene elastomer (A'-8), potassium oleate, Rongalite, and deionized water were charged into a flask charged with nitrogen, and the inner temperature thereof maintained at 70° C., and in the first stage, a mixture of 10 parts of MMA, 4 parts of EA and 0.28 part of cumene hydroperoxide was dropwise added over 20 minutes and held therein for 1 hour.

Then, in the presence of the polymer obtained in the previous stage, in the second stage, a mixture of 16 parts of St and 0.32 part of cumene hydroperoxide was continuously added dropwise over one hour and held therein for 2 hours.

Thereafter, in the presence of the polymers obtained in the first stage and the second stage, in the third stage, a mixture of 5 parts of MMA and 0.1 part of cumene hydroperoxide was added dropwise over 50 minutes and held therein for one hour, to thereby complete the polymerization to obtain a multi-stage copolymer latex.

After 0.5 part of BHT was added to the multi-stage copolymer latex, a 0.2 wt % aqueous sulfuric acid solution was added to coagulate the copolymer, followed by a solidification by a heat treatment at 90° C. Then, the coagulated product was washed with warm water and dried, to thus obtain a multi-stage copolymer powder.

(3) Preparation of Polyvinyl Chloride Resin Composition

A polyvinyl chloride resin composition was prepared under the same conditions as in Comparative Example 1 except that the multi-stage copolymer (B'-8) was used in place of the multi-stage copolymer powder (B'-1).

The physical properties of the composition obtained were measured, and the results are shown in Table 2.

COMPARATIVE EXAMPLE 9

(1) Synthesis of Butadiene Elastomer (A'-9)

| Bd | 75 parts |
|---|---|
| St | 25 parts |
| 1,3-BD | 5 parts |
| Diisopropylbenzene hydroperoxide | 0.2 part |
| Sodium pyrophosphate | 0.5 part |
| Ferrous sulfate | 0.01 part |
| Dextrose | 1 part |
| Potassium oleate | 2 parts |
| Deionized water | 200 parts |

The respective components of the above composition were charged into an autoclave, and the reaction was carried out under stirring at 50° C. for 12 hours to prepare a butadiene elastomer (A'-9). (Conversion 98%, average particle size 0.08μ, glass transition temperature −21° C.)

(2) Synthesis of Multi-Stage Copolymer (B'-9)

A multi-stage copolymer (B'-9) was prepared by using the components of the following composition.

| Butadiene elastomer (A'-9) (as a solid) | 65 parts |
| St | 17 parts |
| MMA | 10 parts |
| EA | 8 parts |
| Potassium oleate | 1.2 parts |
| Cumene hydroperoxide | 0.8 part |
| Rongalite | 0.5 part |
| Deionized water (as a whole) | 200 parts |

Of the component of the above composition, the butadiene elastomer (A'-9), potassium oleate, Rongalite, and deionized water were charged into a flask charged with nitrogen and the inner temperature thereof maintained at 70° C., and in the first stage, a mixture of 8 parts of MMA, 8 parts of EA, and 0.32 part of cumene hydroperoxide was dropwise added over 20 minutes and held therein for 1 hour.

Then, in the presence of the polymer obtained in the previous stage, in the second stage, a mixture of 17 parts of St and 0.34 part of cumene hydroperoxide was continuously added dropwise over one hour and held therein for 2 hours.

Thereafter, in the presence of the polymers obtained in the first stage and the second stage, in the third stage, a mixture of 2 parts of MMA and 0.04 part of cumene hydroperoxide was added dropwise over 50 minutes and held therein for one hour, to thereby complete the polymerization to obtain a multi-stage copolymer latex.

After 0.5 part of BHT was added to the multi-stage copolymer latex, a 0.2 wt % aqueous sulfuric acid solution was added to coagulate the copolymer, followed by a solidification by a heat treatment at 90° C. Then, the coagulated product was washed with warm water and dried, to thus obtain a multi-stage copolymer powder.

(3) Preparation of Polyvinyl Chloride Resin Composition

A polyvinyl chloride type resin composition was prepared under the same conditions as in Comparative Example 1 except that the multi-stage copolymer (B'-9) was used in place of the multi-stage copolymer powder (B'-1).

The physical properties of the composition obtained were measured, and the results are shown in Table 2.

TABLE 1

| | Multi-stage copolymer | | | | | | | | | |
|---|---|---|---|---|---|---|---|---|---|---|
| | Composition ratio of butadiene elastomer | | | | Glass temperature of butadiene elastomer (°C.) | Content of butadiene elastomer in multi-stage copolymer (parts) | Composition ratio of resin formable monomers (parts) | | | |
| | | | | | | | First stage | | Second stage | Third stage |
| | Bd (%) | St (%) | DVB (parts) | 1,3-BD (parts) | | | MMA | EA | St | MMA |
| Example 1 | 75 | 25 | 7 | 0 | −15 | 65 | 11 | 3 | 15 | 6 |
| Example 2 | 80 | 20 | 5 | 0 | −23 | 60 | 14 | 4 | 16 | 6 |
| Example 3 | 80 | 20 | 6 | 0 | −20 | 65 | 13 | 3 | 15 | 4 |
| Example 4 | 85 | 15 | 8 | 0 | −26 | 63 | 12 | 4 | 18 | 3 |
| Example 5 | 85 | 15 | 4 | 0 | −33 | 65 | 6 | 5 | 20 | 4 |
| Example 6 | 80 | 20 | 0 | 5 | −25 | 60 | 10 | 3 | 23 | 4 |
| Example 7 | 75 | 25 | 0 | 8 | −15 | 65 | 11 | 4 | 15 | 5 |

| | Composition ratio of polyvinyl chloride resin composition | | Physical properties of composition | | | |
|---|---|---|---|---|---|---|
| | | | Transparency | | Stress whitening resistance | Falling weight strength (dart impact 50% breaking height) (cm) |
| | Polyvinyl chloride resin (parts) | Multi-stage copolymer (parts) | Total light transmittance (%) | Haze value (%) | | |
| Example 1 | 100 | 10 | 84.9 | 5.0 | A | 124 |
| Example 2 | 100 | 10 | 84.7 | 5.4 | A | 103 |
| Example 3 | 100 | 10 | 84.9 | 3.6 | A | 112 |
| Example 4 | 100 | 10 | 84.8 | 4.3 | A | 118 |
| Example 5 | 100 | 10 | 85.0 | 5.2 | A | 132 |
| Example 6 | 100 | 10 | 84.0 | 5.6 | A | 100 |
| Example 7 | 100 | 10 | 84.3 | 4.9 | A | 115 |

TABLE 2

| | Multi-stage copolymer | | | | | | | | | | |
|---|---|---|---|---|---|---|---|---|---|---|---|
| | Composition ratio of butadiene elastomer | | | | Glass temperature of butadiene elastomer (°C.) | Content of butadiene elastomer in multi-stage copolymer (parts) | Composition ratio of resin formable monomers (parts) | | | | |
| | | | | | | | First stage | | Second stage | | Third stage |
| | Bd (%) | St (%) | DVB (parts) | 1,3-BD (parts) | | | | | | | |
| Comparative Example 1 | 75 | 25 | 0 | 0 | −28 | 65 | MMA 10 | EA 3 | St 16 | MMA 4 | EA 2 |
| Comparative Example 2 | 75 | 25 | 0 | 0 | −28 | 65 | MMA 10 | St 15 | MMA 10 | | — |
| Comparative Example 3 | 90 | 10 | 1 | 0 | −43 | 60 | MMA 15 | | St 25 | | — |
| Comparative Example 4 | 85 | 15 | 1 | 0 | −38 | 60 | MMA 10 | EA 2 | St 23 | MMA 5 | |

TABLE 2-continued

| | | | | | | | | | | | |
|---|---|---|---|---|---|---|---|---|---|---|---|
| Comparative Example 5 | 80 | 20 | 5 | 0 | −25 | 80 | MMA 9 | | St 8 | | MMA 3 | |
| Comparative Example 6 | 75 | 25 | 6 | 0 | −17 | 65 | MMA 11 | EA 3 | St 15 | | MMA 3 | EA 3 |
| Comparative Example 7 | 75 | 25 | 8 | 0 | −13 | 65 | MMA 6 | St 14 | MMA 15 | | — | |
| Comparative Example 8 | 80 | 20 | 0 | 1 | −32 | 65 | MMA 10 | EA 4 | St 16 | | MMA 5 | |
| Comparative Example 9 | 75 | 25 | 0 | 5 | −21 | 65 | MMA 8 | EA 8 | St 17 | | MMA 2 | |

| | Composition ratio of polyvinyl chloride resin composition | | Physical properties of composition | | | |
|---|---|---|---|---|---|---|
| | | | Transparency | | Stress whitening resistance | Falling weight strength (dart impact 50% breaking height) (cm) |
| | Polyvinyl chloride resin (parts) | Multi-stage copolymer (parts) | Total light transmittance (%) | Haze value (%) | | |
| Comparative Example 1 | 100 | 10 | 83.9 | 6.9 | C | 64 |
| Comparative Example 2 | 100 | 10 | 82.5 | 7.2 | B–C | 63 |
| Comparative Example 3 | 100 | 10 | 80.1 | 11.6 | C | 71 |
| Comparative Example 4 | 100 | 10 | 82.7 | 6.8 | C | 69 |
| Comparative Example 5 | 100 | 10 | 76.3 | 12.4 | C | 114 |
| Comparative Example 6 | 100 | 10 | 84.1 | 5.8 | C | 101 |
| Comparative Example 7 | 100 | 10 | 83.3 | 6.1 | B | 98 |
| Comparative Example 8 | 100 | 10 | 83.0 | 6.5 | C | 66 |
| Comparative Example 9 | 100 | 10 | 81.5 | 7.1 | B–C | 87 |

The present invention exhibits a superior feature in that a polyvinyl resin composition having an excellent falling weight impact resistance, stress whitening resistance and optical characteristics can be obtained, for the first time, by formulating into a polyvinyl chloride resin a multi-stage copolymer obtained by a combination of using a highly crosslinked butadiene elastomer, polymerizing combined monomers in specific amounts of methyl methacrylate and alkyl acrylate as the resin component formable monomers in the first stage in the presence of the butadiene elastomer, polymerizing only a specific amount of an aromatic vinyl monomer in the second stage, and polymerizing only a specific amount of the remainder of methyl methacrylate in the third stage.

We claim:

1. A polyvinyl chloride resin composition having a high falling weight impact resistance, stress-whitening resistance and optical characteristics, comprising:
   100 parts by weight of a polyvinyl chloride resin and 2 to 40 parts by weight of a multi-stage copolymer obtained by polymerizing resin component formable monomers in the range of from more than 30 parts by weight to 50 parts by weight, said resin component formable monomer being composed of 25 to 55% by weight of methyl methacrylate, 2 to 15% by weight of an alkyl acrylate having a $C_1$-$C_8$ alkyl group and 30 to 60% by weight of an aromatic vinyl monomer in the presence of from 50 parts by weight to less than 70 parts by weight of a butadiene elastomer having a glass transition temperature of from −40° C. to 5° C. obtained by copolymerization of a monomer mixture of 70 to 90% by weight of butadiene, 10 to 30% by weight of an aromatic vinyl monomer and a polyfunctional monomer added in an amount corresponding to 3 to 10 parts by weight per 100 parts by weight of total amount of said butadiene and aromatic vinyl monomer, wherein a polymerization of the resin component formable monomer is conducted by polymerizing in the first stage methyl methacrylate in an amount corresponding to 45 to 85% by weight of the total amount of methyl methacrylate and the alkyl acrylate in an amount in the range specified above, subsequently polymerizing in the second stage the aromatic vinyl monomer in an amount in the range specified above in the presence of the polymer obtained in the previous stage, and further polymerizing in the third stage the remainder of methyl methacrylate in the presence of the polymers obtained in said first and second stages.

2. A polyvinyl chloride resin composition according to claim 1, wherein the butadiene is 1,3-butadiene.

3. A polyvinyl chloride resin composition according to claim 1, wherein the aromatic vinyl monomer as the constituent of the butadiene elastomer is styrene.

4. A polyvinyl chloride resin composition according to claim 1, wherein the polyfunctional monomer is divinylbenzene or 1,3-butylene glycol dimethacrylate.

5. A polyvinyl chloride resin composition according to claim 1, wherein the amount of the polyfunctional monomer is used in an amount corresponding to 3 to 8 parts by weight per 100 parts by weight of the total amount of said butadiene and aromatic vinyl monomer.

6. A polyvinyl chloride resin composition according to claim 1, wherein the amount of methyl methacrylate used in the first stage polymerization is an amount corresponding to 50 to 70% by weight of the total amount of methyl methacrylate.

7. A polyvinyl chloride resin composition according to claim 1, wherein the relative use ratio of methyl methacrylate and the alkyl acrylate in the first stage polymerization has a relationship of a major amount of methyl methacrylate and a minor amount of the alkyl acrylate.

8. A polyvinyl chloride resin composition according to claim 1, wherein the aromatic vinyl monomer of the resin component formable monomers is styrene.

9. A polyvinyl chloride resin composition according to claim 1, wherein the alkyl acrylate is ethyl acrylate or n-butyl acrylate.

* * * * *